Sept. 23, 1969  J. LINGL  3,468,998
METHOD FOR PRODUCING BRICKS AND THEREAFTER HACKING THE SAME
Filed Oct. 3, 1966  2 Sheets-Sheet 1

Inventor:
JOHANN LINGL
By Stewart & Stewart
his Attorneys.

Inventor:
JOHANN LINGL
By Steward + Steward
his Attorneys.

United States Patent Office 3,468,998
Patented Sept. 23, 1969

3,468,998
METHOD FOR PRODUCING BRICKS AND
THEREAFTER HACKING THE SAME
Johann Lingl, Finninger Strasse 70, Neu-Ulm
(Danube), Germany
Filed Oct. 3, 1966, Ser. No. 583,829
Int. Cl. B29c 17/14
U.S. Cl. 264—148                    4 Claims

ABSTRACT OF THE DISCLOSURE

A method of cutting brick from a continuous length or strand of compressed raw material and of stacking the bricks so that the facing sides of the individual bricks lie in full engagement with each other for protection from discoloration when they are fired. The strand of material is cut as it comes from the extruder into sections of desired length for forming a row of bricks of predetermined thickness and number. Each section of material is then pushed in succession laterally through a cutter having vertical cutting wires which slice it into a plurality of individual bricks that form a transverse row. Each such row is moved by the next succeeding row of bricks being cut onto a conveyer that travels in the same direction in which the sections are pushed through the cutter. A first layer of bricks in rows that run longitudinally as well as transversely of the conveyer is thus formed on the conveyer and is moved a predetermined distance from the starting end of the conveyer. A second layer of the same number of rows is formed in the same manner at the starting end of the conveyer, and this second layer is gripped by a turn-over device which swings it through an angle of 180° face-down on the first layer, so that the bricks of both layers are in vertical alignment with each other. The double-layer flat thus formed is then lifted bodily by a gripper assembly which grips the ends of each longitudinal double-layer row of bricks in the flat, spreads the longitudinal rows apart and deposits them on a kiln car.

Figure 1:
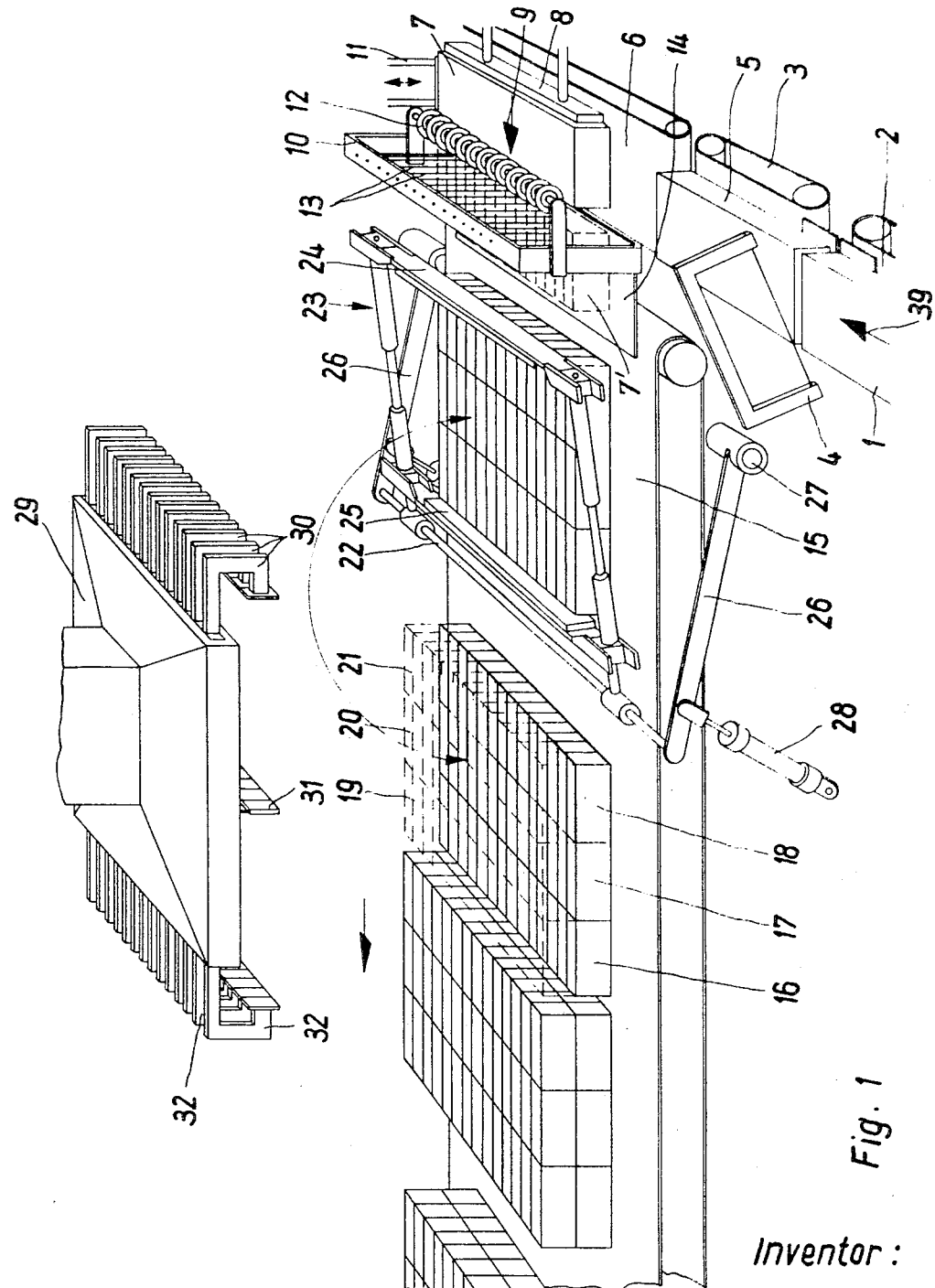

The present invention relates to a method for producing brick and for thereafter hacking the same, and it is the principal object of the invention to hack raw or "green" brick coming from an extrusion press so that the hacks may be conveyed on a kiln car immediately into the kiln.

More particularly, it is an object of this invention to hack facing bricks which, if there is a danger that they might become discolored in burning, have to be placed in the kiln with their face sides applied against each other so that these sides will be shielded from the direct influence of the hot gases in the kiln and will thus be protected from discoloration.

Although different types of conveying apparatus have been designed for this purpose prior to this invention, these apparatus have the disadvantage that they cannot operate automatically if the hacks have to deviate from a uniform shape or pattern, for example, if a base layer of bricks is to be provided with recesses into which the arms of a brick lifter are to engage for lifting and transporting the hacks. Furthermore, these known apparauts only permit a relatively low hourly output. Thus, for example, for hacking the bricks coming from a press with an hourly output of about 20,000 bricks, it is necessary to employ two of these known apparatus.

It is therefore another object of this invention to provide a method of producing hacks of brick of different patterns or arrangements which may also be preset automatically by suitable adjustments of a program control device.

It is another object of the invention to provide a method of hacking brick which permits a considerably higher hourly output to be attained than that which was attainable by any of the methods and apparatus as were known prior to this invention so that a single apparatus will suffice for hacking the entire output of a brick press. This press which does not constitute a part of the invention should be one of the type in which the raw material is compressed to such an extent that, when the long strand of this material is extruded from the press it will possess such a high stability that, when it is thereafter divided into individual raw bricks, these bricks will resist practically any deformation during the subsequent hacking operation.

A further object of the invention consists in the combination of providing a very economical method of producing raw bricks from a strand of material coming from an extrusion press with a likewise very economical method of thereafter hacking these bricks in a manner similar to that as described and claimed in my copending application, Ser. No. 559,200, filed on June 21, 1966, now Patent No. 3,388,815. Therefore, while my copending application only relates to a method and apparatus for hacking the bricks, the present invention relates to a new method for cutting the strand of compressed material into individual bricks and to the combination of this method with a method for thereafter hacking the bricks in such a manner that the face sides of the individual bricks will lie directly on, and in registry with, each other and will thus be protected from discoloration in the subseqent burning operation.

The individual steps of the method according to the invention consist of moving the strand of compressed material on a conveyer from the extrusion press in one direction and cutting the strand into sections or blocks of a certain length substantially in accordance with the desired length of each row of bricks; of moving these blocks on a further conveyer successively against a back stop; of then pushing each block laterally through a vertical cutter frame in which the block is cut up by cutter wires into a row of individual raw bricks, and of also moving the successive rows against each other upon another conveyer which preferably extends at a right angle to the first conveyers; of then conveying a group consisting of a certain number of parallel rows, which make up a first layer of bricks, along this last conveyer; gripping the next group of rows after they are formed into a second layer identical with the first, then swinging the second layer by means of a turnover device about an angle of approximately 180° so that it will be deposited in a face-down position on the first layer in accurate vertical alignment therewith. The double-layer flat which is thus formed consists of rows of bricks that extend longitudinally, as well as laterally, of the conveyer on which they are then supported. This double-layer flat is then gripped by a gripped by a gripper assembly consisting of a plurality of individual grippers which grip the ends of each longitudinal double-layer row of bricks of this flat, lifting them all together as a flat off the conveyer. While thus suspending this flat of bricks, the individual grippers of this assembly may be moved for a predetermined distance laterally away from each other so that the individual double-layer rows of this group will also be spaced at such a distance from each other and will then be deposited in such a position, for example, on a kiln car or other support.

The gripper assembly which is employed in carrying out this method is preferably designed substantially as described and claimed in my previous patent No. 3,270,897.

The method according to the present invention has the advantage of being much more simple than the method as described in my copending application, Serial No. 559,200, now Patent No. 3,388,815 since by the operation of cutting the raw bricks apart from the strand of material coming from the extrusion press in a position in longitudinal alignment with the further movement of the brick rows and the subsequent operation of assembling them into double-layer flats, the step of shifting the rows of bricks alternately from one conveyer to two other conveyers at both sides thereof as described in my previous application will be omitted. Since the relatively complicated shifting mechanism may also be omitted, it is evident that the apparatus for carrying out the method of the present invention is also considerably less expensive and more reliable in operation.

In order to facilitate and improve the cutting operation, it is advisable after each section or block of material has been cut off from the strand coming from the extrusion press to pass this block underneath a row of notching rolls toward the cutting wires. These notching rolls which are located directly up-stream of the cutting wires at a distance from each other equal to the width of a brick will press a plurality of grooves or notches into the upper surface of the block and will thereby prevent frayed edges from being formed on the individual bricks during the subsequent cutting operation.

For pushing each block through the cutting wires after being moved by a conveyer against a fixed back stop, a suitable pusher is preferably pressed against one lateral side of the block. In order to prevent the rear edges of the raw bricks from being frayed by the cutting wires, it is advisable not to push the blocks completely but only for a certain distance through the cutting wires by means of the pusher and then to withdraw the pusher and move the next block against the back stop, this next block being pressed laterally against the preceding block in order to push it the rest of the way through the cutter to complete the cut.

The gripper assembly, which is employed in carrying out the method according to the invention and should in principle be similar to the gripper assembly according to my previous U.S. Patent No. 3,270,897, is preferably designed so as to be able to pick up two succeesive double-layer flats of bricks simutaneously and to transfer them to the place where they are to be deposited, and during this transfer preferably to separate the individual longitudinal double-layer rows for a certain distance from each other.

For carrying out the cutting operation in accordance with the invention, it is advisable to employ a vertical cutting frame in which the cutting wires are mounted so as likewise to extend in a vertical direction and at a distance from each other equal to the width of a brick. This frame preferably also serves as a support for the notching rolls, and for this purpose its lateral frame members carry a pair of brackets on which the common shaft of the notching rolls is mounted.

The turnover device which is to be employed in the method according to the invention preferably consists of a frame which is pivotable about the axis of a shaft. Two opposite sides of this frame preferably form gripping plates and are movable relative to each other. For adjusting the turnover device to at least two different levels for depositing at least two layers of brick rows on top of each other, the shaft of the frame is rotatably mounted on one end of a pair of arms which is pivotable at the other end about a fixed axis, for example, by means of a pair of pneumatic cylinder-and-piston units.

The apparatus for carrying out the method according to the invention preferably comprises four belt conveyers, the first three of which extend substantially in the same direction. The first of these conveyers is driven continuously in accordance with the rate of extrusion of the press and it is followed by the second conveyer which is driven at a higher speed than the first, while the following third conveyer is driven intermittently in the same manner as the fourth conveyer which extends substantially at a right angle to the preceding conveyer.

The various features of the method according to the invention will become more clearly apparent from the following detailed description thereof which is to be read with reference to the accompanying drawings, in which—

Figure 2:
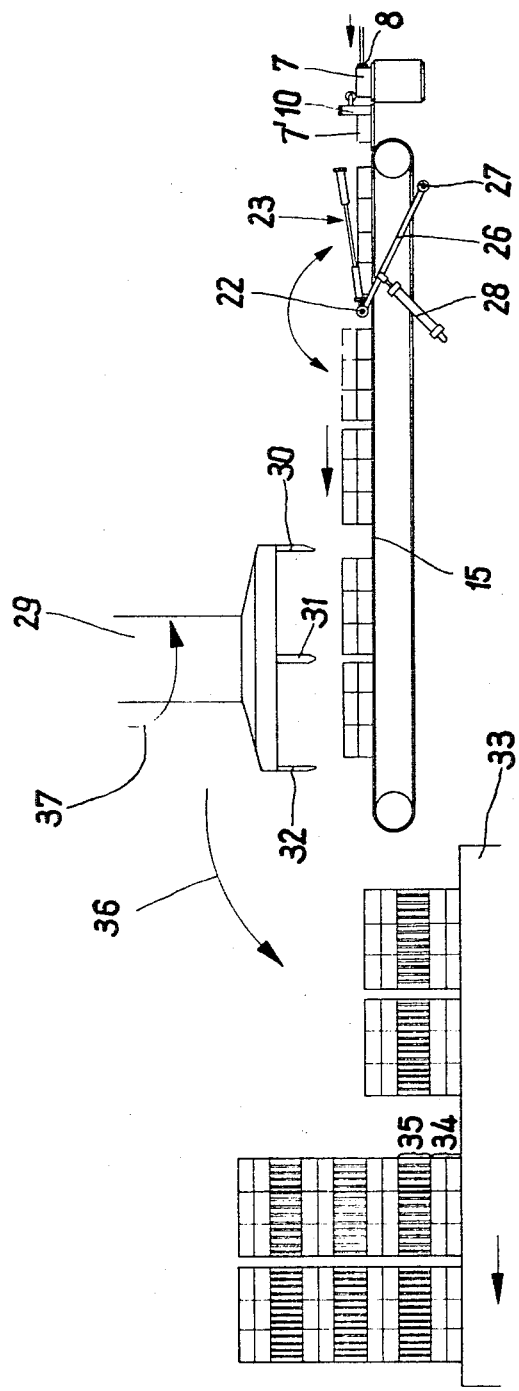

FIGURE 1 shows a perspective view of the apparatus for carrying out the method of the present invention; and FIGURE 2 shows a diagrammatic side view of the apparatus which illustrates its principle of operation.

The apparatus according to the invention as illustrated in FIGURE 1 comprises first a belt conveyer 2 which is adapted to convey the compressed strand 1 of clay or similar material from the extrusion press (not shown) in which it has been produced in the direction of the arrow 39. At the end of this conveyer 2, the strand 1 is cut into individual sections or blocks 5 of a certain length by means of a cutting wire 4, as merely indicated diagrammatically. These blocks 5 then pass upon a second belt convey 3 which is driven at a higher speed than the conveyer 2 and moves the blocks 5 to a further belt conveyer 6 which is driven intermittently. The conveyer 6 thus moves each block 5 to a position 7 in which the block is stopped by a back stop 11 which is designed, for example, in the form of a switch which may also stop the movement of the conveyer 6 and then start the operation of a pusher 8 which acts upon one lateral side of block 5 and pushes the same in the direction of the arrow 9 toward a cutter frame 10. This cutter frame 10 is provided with a plurality of vertical cutting wires 13 which are spaced from each other at a distance equal to the width of a brick. The lateral arms of the cutter frame 10 carry a pair of brackets on which the common shaft of a plurality of notching rolls 12 is mounted. These notching rolls 12 are located directly in line with, and up-stream of, the individual cutting wires 13 and therefore they are likewise spaced from each other at a distance equal to the width of a brick.

By means of the pusher 8, the block 7 is then pushed through the cutting wires 13 up to a point near its rear edges. In order to prevent the rear edges of the raw bricks which are thus formed from being frayed or ripped by the cutting wires 13 at the end of the cutting operation, the last part of the pushing operation is not carried out by the pusher 8 itself, but by the next following block 5 which in the meantime has been moved forwardly and against the back stop 11 by the conveyer 6. This next block 5 is then likewise pushed by the pusher 8 in the direction of the arrow 9 and thus against the rear side of the preceding block 7' (shown in broken lines), which is thereby pushed completely through the cutting wires 13 so that a row of individual bricks is then formed on a platform 14 at the other side of the cutting wires.

Each individual row of bricks is pushed by the succeeding row successively from this platform 14 upon a further conveyer belt 15 which is likewise moved intermittently. While three successive rows of bricks are pushed on this belt 15 against each other and are moved by the belt to the positions 16, 17, and 18, these three rows forming the first layer of a double-layer flat. The next three rows which form the second layer are then advanced on belt 15 to a position in which they may be gripped by the turnover device 23. This turnover device 23 consists of two parallel gripper plates 24 and 25 which are movable relative to each other by a pair of lateral pneumatically controlled cylinder-and-piston units so as to grip or release, for example, three rows of bricks. For swinging the turnover device 23 from one side to the other so as to deposit the second layer of bricks 19, 20, 21 (shown in broken lines) face-down on the first layer 16, 17, 18, this device is pivotable by suitable driving means, not shown, about the axis of a shaft 22 which is mounted on one end of a pair of arms 26. In order to permit the first layer of bricks 16, 17, 18 to be moved by the conveyer belt 15 underneath the turnover device 23 to the position as shown in FIGURE 1 and also to permit the next three rows of bricks on belt 15 to be gripped by the gripping plates 24 and 25 while these plates are disposed within vertical planes, and then to be swung over by the turnover device 23 from the level of belt 15 at the right side of the shaft 22 of the turnover device 23 to the higher level of the second layer of bricks 19, 20, 21 on top of the first layer 16, 17, 18 at the left side of shaft 22, the two arms 26 are pivotable about an axis 27 by means of a pair of pneumatic cylinder-and-piston units 28. A cranklike movement is thus carried out by shaft 22 and arms 26 which permits the second layer of bricks 19, 20, 21 to be picked up by the turnover device 23 in a horizontal position at the lower level on belt 15 and, after being swung over, to be deposited likewise in a horizontal position but at a higher level upon the first layer 16, 17, 18.

Each double-layer flat of brick rows which is thus formed is then further conveyed along the conveyer 15. Two successive double-layer groups then pass underneath a gripper assembly 29 which is provided with individual outer gripper arms 30 and 32 and intermediate tongues 31 against which the longitudinal rows of bricks are pressed by gripping plates on the individual gripper arms 30 and 32 after the gripper assembly 29 has been lowered. This gripper assembly 29 then conveys these two double-layer groups to any desired place and deposits them thereon. Of course, in order for the gripper plates on the arms 30 and 32 together with the intermediate tongues 31 to be able to grip two superimposed layers of bricks simultaneously, they should be twice as high as shown in FIGURE 1 and also twice as high as the gripper plates 24 and 25 of the turnover device 23.

The principle of operation of the method according to the invention is more clearly illustrated in FIGURE 2 which shows that the gripper assembly 29 may first be moved in the direction of the arrow 36 so as to deposit one double-layer of bricks, for example, on a kiln car 33. This first double-layer flat forms a base for a stack of bricks. Then after the gripper assembly 24 has picked up another double-layer it may be turned 90° about its axis, as indicated by the arrow 37, so as to stack this second double-layer on the first double-layer at right angles thereto. These operations may be repeated as often as desired with the following double-layer groups until the stack of cross-hacked brick layers has reached the desired height.

In conclusion it may be mentioned that the gripper assembly may also be of a different type of construction than that described above, although preferably it should be designed so as to permit its individual gripper arms to be adjustable to different distances from each other in a direction vertical to the plane of FIGURE 2 so that the individual rows of bricks may be separated from each other as much as necessary for being properly exposed to the oven gases and also for being easily picked up by forklifts.

Having thus fully disclosed my invention, what I claim is:

1. A method of producing raw bricks from a strand of compressed material emerging from an extrusion press and of hacking said bricks comprising the steps of conveying the strand in one direction and cutting said strand into sections of a length substantially equal to the length of a row of bricks to be produced, moving each section length-wise against a back stop, pushing a first group of said sections successively from said back stop in a lateral direction substantially at right angles to said first direction through a cutter frame so as to divide each section into a row of separate bricks and also to push each succeeding row laterally against the others in order to move said group of rows onto a conveyer extending substantially at a right angle to said first direction, thereby forming a first flat of transverse brick rows on said conveyer, moving said first flat by said conveyer to a certain fixed position spaced from the beginning of said conveyer, pushing a second group of said sections equal to said first group successively through said cutter frame and upon said conveyer so as to form a second flat of transverse brick rows on said conveyer near the beginning thereof, said bricks in each of said flats also forming rows extending longitudinally of said conveyer, gripping said second flat of brick rows and swinging it through an angle of substantially 180° about an axis extending at right angles to said conveyer in the direction toward, upon, in registry with and face down on, said first flat so as to form a double-layer flat in which the face sides of the bricks of both layers engage upon each other, then gripping the narrow front and rear ends of each longitudinal row of at least one double-layer flat, lifting the same, and then depositing the same on a support so as to form a base for a hack on which subsequently other double-layer flats may be deposited to increase the height of said hack.

2. A method as defined in claim 1, further comprising the step of drawing apart the adjacent longitudinal rows of a said double-layer flat after being lifted off said conveyer so as to be spaced at a certain distance from each other in which position said double-layer flat is then deposited on said support.

3. A method as defined in claim 1, further comprising the step of notching each section of said strand when pushed in said lateral direction for providing at least one wider side of said section with notches spaced from each other at a distance equal to the width of a brick before said section is pushed through said cutter frame and is cut through along said notches.

4. A method as defined in claim 1, in which the largest part of each section of said strand is first pressed through said cutter frame by a pusher acting directly upon one lateral side of said section, and said section is thereafter pressed fully through said cutter frame by said pusher pressing the subsequent section of said strand against said lateral side.

References Cited

UNITED STATES PATENTS

| | | |
|---|---|---|
| 2,456,327 | 12/1948 | Sauter et al. |
| 2,955,717 | 10/1960 | Segur et al. |
| 3,032,851 | 5/1962 | Gibbs _____ 25—2 |
| 3,039,593 | 6/1962 | Edmonds et al. _____ 198—35 |
| 3,080,070 | 3/1963 | Euwe _____ 53—164 X |
| 3,347,397 | 10/1967 | Hein. |
| 3,350,757 | 11/1967 | Bowles _____ 264—150 X |
| 3,402,834 | 9/1968 | Kelsey. |
| 1,469,852 | 10/1923 | Simpson _____ 25—105 |

ROBERT F. WHITE, Primary Examiner

S. I. LANDSMAN, Assistant Examiner

U.S. Cl. X.R.

25—2, 105, 112; 198—35; 214—6; 264—157